US012803020B2

(12) United States Patent
Baek

(10) Patent No.: US 12,803,020 B2
(45) Date of Patent: Nov. 17, 2026

(54) FUEL CELL VEHICLE AND FUEL CELL VEHICLE CONTROL METHOD

(71) Applicants: HYUNDAI MOTOR COMPANY, Seoul (KR); KIA CORPORATION, Seoul (KR)

(72) Inventor: Gwan Ho Baek, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 749 days.

(21) Appl. No.: 18/137,052

(22) Filed: Apr. 20, 2023

(65) Prior Publication Data

US 2024/0186549 A1 Jun. 6, 2024

(30) Foreign Application Priority Data

Dec. 5, 2022 (KR) ........................ 10-2022-0167905

(51) Int. Cl.

*H01M 8/04007* (2016.01)
*B60L 50/75* (2019.01)
*H01M 8/04701* (2016.01)
*H01M 8/2465* (2016.01)
*H02J 7/90* (2026.01)

(52) U.S. Cl.

CPC ......... *H01M 8/04738* (2013.01); *B60L 50/75* (2019.02); *H01M 8/04007* (2013.01); *H01M 8/2465* (2013.01); *H02J 7/90* (2026.01)

(58) Field of Classification Search

CPC ......... H01M 8/04738; H01M 8/04007; H01M 8/2465; H02J 7/007; B60L 50/75

See application file for complete search history.

(56) References Cited

U.S. PATENT DOCUMENTS

2009/0280372 A1* 11/2009 Maenaka .......... H01M 8/04768 429/429
2018/0334160 A1* 11/2018 Kava ..................... B60W 20/13

FOREIGN PATENT DOCUMENTS

JP 2021-182529 A * 11/2021 ........ H01M 8/04694
KR 10-2422145 B1 7/2022

OTHER PUBLICATIONS

Machine Translation JP2021182529A (Year: 2021).*

* cited by examiner

*Primary Examiner* — Osei K Amponsah
(74) *Attorney, Agent, or Firm* — MCDONNELL BOEHNEN HULBERT & BERGHOFF LLP

(57) ABSTRACT

A fuel cell vehicle includes a fuel cell stack, an air compressor configured to supply air to the fuel cell stack, and a controller configured to increase air compressor driving at a launch control function activation request, charge a battery through an output of the fuel cell stack, thereby preparing to activate a launch control function, and output a signal indicating that the launch control function can be activated when the output of the fuel cell stack or the amount of charging of the battery has reached a preset value.

14 Claims, 2 Drawing Sheets

FUEL CELL VEHICLE AND FUEL CELL VEHICLE CONTROL METHOD

CROSS REFERENCE TO RELATED APPLICATIONS

This application is based on and claims priority under 35 U.S.C. § 119 to Korean Patent Application No. 10-2022-0167905, filed on Dec. 5, 2022, in the Korean Intellectual Property Office, the disclosure of which is herein incorporated by reference in its entirety.

BACKGROUND

1. Field

The present disclosure relates to a fuel cell vehicle and a fuel cell vehicle control method. More specifically, the present disclosure relates to fuel cell vehicle launch control.

2. Description of the Prior Art

A fuel cell refers to a device for generating electric energy through an electrochemical reaction inside a fuel cell stack by using hydrogen and air supplied from the outside, and may be used as the source of electric power in various fields (for example, a fuel cell electric vehicle (FCEV), a fuel cell for power generation).

A fuel cell system includes a fuel cell stack having multiple fuel cells stacked and used as a power source, a fuel supply system for supplying fuel (hydrogen and the like) to the fuel cell stack, an air supply system for supplying an oxidizer (oxygen) necessary for the electrochemical reaction, and a water/heat management system for controlling the temperature of the fuel cell stack.

The fuel supply system decompresses compressed hydrogen in a hydrogen tank and supplies the same to the anode (fuel electrode) of the fuel cell stack. The air supply system activates an air compressor so as to supply suctioned outer air to the cathode (air electrode) of the fuel cell stack.

If hydrogen is supplied to the fuel electrode of the fuel cell stack, and if oxygen is supplied to the air electrode, hydrogen ions are separated through a catalyst reaction at the fuel electrode. The separated hydrogen ions are delivered to the cathode (air electrode) through an electrolyte membrane. At the cathode, the hydrogen ions separated at the fuel electrode, electrons, and oxygen undergo an electrochemical reaction together, thereby generating electric energy. Specifically, electrochemical oxidation of hydrogen occurs at the fuel electrode, and electrochemical reduction of oxygen occurs at the air electrode. The resulting electrons, when moved, generate electricity and heat, and a chemical action that combines hydrogen and oxygen generates water vapor or water.

A discharge device is provided to discharge byproducts (water vapor, water, heat) generated in the electric energy generating process by the fuel cell stack, as well as unreacted hydrogen and oxygen. Gases such as water vapor, hydrogen, and oxygen are discharged to the atmosphere through a discharge passage.

The electrochemical reaction occurring in the fuel cell is expressed by a reaction formula as follows:

$$\text{[reaction at anode]}2H_2(g)\rightarrow 4H^+(aq.)+4e^-$$

$$\text{[reaction at cathode]}O_2(g)+4H^+(aq.)+4e^-\rightarrow 2H_2O(l)$$

$$\text{[entire reaction]}2H_2(g)+O_2(g)\rightarrow 2H_2O(l)+\text{electric energy}+\text{thermal energy}$$

As described in the above reaction formula, hydrogen molecules are decomposed at the anode, thereby generating four hydrogen ions and four electrons. The electrons move through an external circuit, thereby generating an electric current (electric energy), and the hydrogen ions move to the cathode through the electrolyte membrane and undergo a cathode reaction, thereby generating water and heat as byproducts of the electrochemical reaction.

Meanwhile, launch control refers to a technology for using the maximum output that a vehicle can have from the start such that the vehicle can quickly reach the top speed. Technologies related to launch control have been universally applied to internal combustion engine vehicles, hybrid vehicles, or electric vehicles. However, fuel cell vehicles need an air compressor driving time, an air diffusion time, and an electrochemical reaction time. Accordingly, fuel cell vehicles have lower responsiveness than other kinds of vehicles, thereby posing a problem in that a longer time is taken to reach the top speed.

The above descriptions regarding background technologies have been made only to help understanding of the background of the present disclosure, and are not to be deemed by those skilled in the art to correspond to already-known prior arts.

SUMMARY

The present disclosure has been proposed to solve the above-mentioned problems, and may provide a fuel cell vehicle and a fuel cell vehicle control method, wherein, when launch control of the fuel cell vehicle is activated, the responsiveness of the fuel cell vehicle to the launch control is improved, thereby improving the performance of rapid acceleration from a standstill state.

In accordance with an aspect of the present disclosure, a fuel cell vehicle may include: a fuel cell stack, an air compressor configured to supply air to the fuel cell stack, and a controller configured to increase air compressor driving at a launch control function activation request, charge a battery through an output of the fuel cell stack, thereby preparing to activate a launch control function, and output a signal indicating that the launch control function can be activated when the output of the fuel cell stack or the amount of charging of the battery has reached a preset value.

The controller may drive the air compressor at a maximum speed at a launch control function activation request.

The controller may set a capacity lower than the maximum capacity of the battery as the target amount of charging of the battery when the launch control function is deactivated, and increases the target amount of charging at a launch control function activation request.

The fuel cell vehicle may further include a charging/discharging means, and the controller may control the charging/discharging means such that the amount of charging of the battery reaches the preset value at a launch control function activation request.

The fuel cell vehicle may further include multiple auxiliary devices (BoP) configured to assist the fuel cell stack, and the controller may control the auxiliary devices such that the auxiliary devices consume maximum power.

The fuel cell vehicle may further include a cooling device configured to cool the fuel cell stack, and the controller may control the cooling device such that the cooling device cools the fuel cell stack.

The controller may compare the current output of the fuel cell stack with power which can be consumed by multiple auxiliary devices (BoP), a driving motor, or a battery at a launch control function activation request, and may adjust opening/closing of an air cut-off value, when the current output of the fuel cell stack is larger, such that the current output of the fuel cell stack is controlled to be lower than the power which can be consumed by multiple auxiliary devices (BoP), a driving motor, or a battery.

The controller may identify the current output of the fuel cell stack or the amount of charging of the battery and may output signal indicating that the launch control function can be activated when the current output of the fuel cell stack or the amount of charging of the battery has reached a preset value.

The controller may compare the current output of the fuel cell stack with power which can be consumed by multiple auxiliary devices (BoP), a driving motor, or a battery at a launch control function activation request, and may fully open an air cut-off value when the current output of the fuel cell stack is smaller.

The controller may identify the current output of the fuel cell stack or the amount of charging of the battery and may output a signal indicating that the launch control function can be activated when the current output of the fuel cell stack or the amount of charging of the battery has reached a preset value.

The controller may determine a user's intention to accelerate after outputting a signal indicating that the launch control function can be activated, and may drive the vehicle when the user is deemed to have an intention to accelerate.

The controller may deactivate the launch control function when a user is deemed to have no intention to accelerate after outputting a signal indicating that the launch control function can be activated.

The controller may deactivate the launch control function when a user is deemed to have no intention to accelerate until the amount of charging of the battery reaches the target amount of charging after outputting a signal indicating that the launch control function can be activated.

A method for controlling the fuel cell vehicle may include determining a user's intention to activate a launch control function by a controller, preparing to activate the launch control function by the controller, and outputting a signal indicating that the launch control function can be activated by the controller.

In the preparing to activate the launch control function, air compressor driving may be increased, and the battery may be charged through an output of the fuel cell stack, thereby preparing to activate the launch control function, and in the outputting a signal indicating that the launch control function can be activated, the signal indicating that the launch control function can be activated may be output when the output of the fuel cell stack or the amount of charging of the battery reaches a preset value.

According to a fuel cell vehicle and a fuel cell vehicle control method of the present disclosure, when launch control of the fuel cell vehicle is activated, the responsiveness of the fuel cell vehicle to the launch control is improved, thereby improving the performance of rapid acceleration from a standstill state.

BRIEF DESCRIPTION OF THE FIGURES

The above and other aspects, features, and advantages of the present disclosure will be more apparent from the following detailed description taken in conjunction with the accompanying drawings, in which.

DETAILED DESCRIPTION

Figure 1:
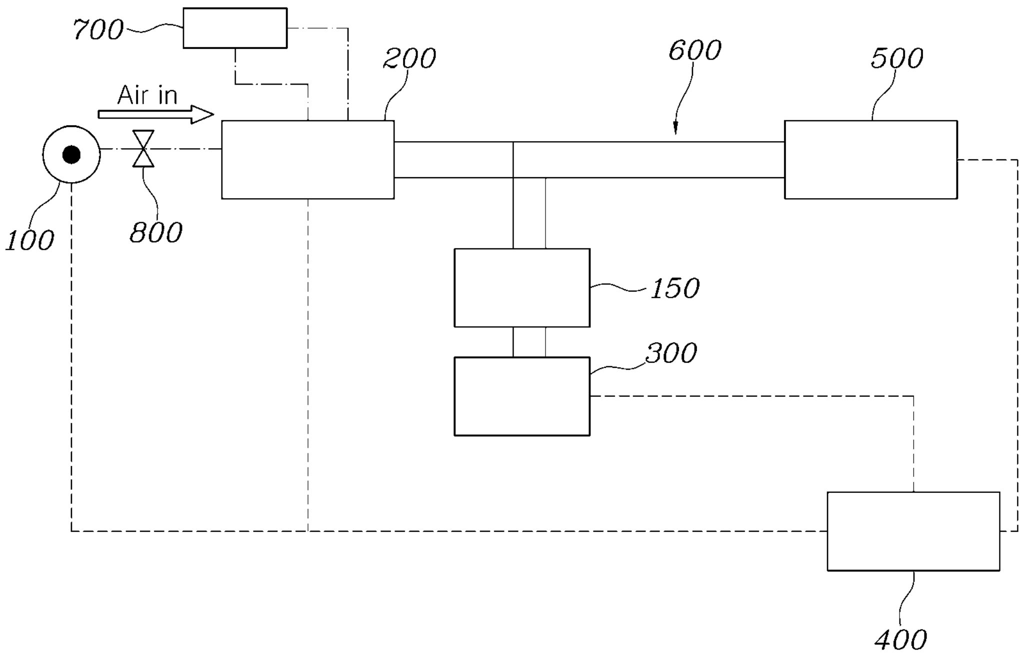
FIG. 1 schematically illustrates a fuel cell system according to an embodiment of the present disclosure.

Hereinafter, embodiments disclosed in the present specification will be described in detail with reference to the accompanying drawings, and the same or similar elements are given the same and similar reference numerals, so duplicate descriptions thereof will be omitted.

In describing the embodiments disclosed in the present specification, when the detailed description of the relevant known technology is determined to unnecessarily obscure the gist of the present disclosure, the detailed description may be omitted. Furthermore, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

High-performance vehicles are commonly equipped with a launch control function, which is usually used to measure the time necessary to accelerate from 0 to 100 km/h. The launch control function may be activated in various manners, depending on the manufacturer and vehicle type. A button may be used to activate the launch control function, or the acceleration pedal and the brake of the vehicle may be pressed simultaneously to accelerate the function.

Meanwhile, fuel cell vehicles have slow responsiveness to the launch control function because a time is necessary for the electrochemical reaction, unlike internal combustion engine vehicles or electric vehicles. For this reason, it takes a longer time for fuel cell vehicles to reach the top speed.

The present disclosure may provide a control method wherein, when the launch control function of a fuel cell vehicle is activated, the responsiveness of the fuel cell is improved such that the launch control function can be performed in a facilitated manner, thereby generating the maximum output and enabling fast acceleration.

In accordance with an aspect of the present disclosure, a fuel cell vehicle includes a fuel cell stack 200, an air compressor 100 configured to supply air to the fuel cell stack 100, and a controller 400 configured to increase driving of the air compressor 100 at a launch control function activation request, charge a battery 300 through output of the fuel cell stack 200, thereby preparing for launch control function activation, and output a signal indicating that the launch control function can be activated when the output of the fuel cell stack 200 or the amount of charging of the battery 300 reaches a preset value.

Specifically, referring to FIG. 1, the controller 400 increases the driving speed of the air compressor 100 at a launch control function activation request. After the driving speed of the air compressor 100 is increased, the flow rate and pressure or air flowing into the fuel cell stack 200 may increase, thereby improving the output of the fuel cell stack 200.

The controller may include a communication device configured to communicate with another controller or a sensor in order to control entrusted functions, a memory configured to store an operating system, logic commands, input/output information, etc., and one or more processors configured to perform determination, operation, decision, etc. necessary to control entrusted functions.

The controller 400 may drive the air compressor 100 at the maximum speed at a launch control function activation request. The fuel cell stack 200 needs to exert the maximum output such that the fuel cell vehicle reaches the top speed within a short period of time when the launch control function is activated. Accordingly, the air compressor 100 is preferably driven at the highest speed.

When the launch control function is not activated, the controller 400 may set the target amount of charging of the battery 300 to be lower than the maximum capacity of the battery 300, and may increase the target amount of charging at a launch control function activation request.

For example, when the launch control function is not activated, the target amount of charging of the battery 300 may be set to be 80% of the maximum capacity, and the target amount of charging may be set to be 90% of the maximum capacity at a launch control function activation request.

Specifically, when a lithium ion battery or the like used for a fuel cell vehicle is fully charged, the battery internal resistance increases, or an increasing amount of lithium ions or the like exhibit irreversibility, thereby degrading the battery lifespan. Therefore, in a normal situation in which the launch control function is not activated, the target amount of charging of the battery is preferably set to be lower than the maximum capacity of the battery.

That is, when the launch control function is not activated, the target amount of charging of the battery 300 is preferably decreased.

When the launch control function is activated, the target amount of charging of the battery 300 is preferably increased. In a situation in which the launch control function is activated such that a high output is necessary within a short period of time for rapid acceleration, the driving motor 500 consumes a large amount of power, thereby making it necessary to increase the target amount of charging of the battery 300 at a launch control function activation request.

Meanwhile, the fuel cell vehicle may further include a charging/discharging means 150, and the controller 400 may control the charging/discharging means 150 such that target amount of charging of the battery 300 reaches a preset value at a launch control function activation request.

Specifically, the charging/discharging means 150 may be a bidirectional high-voltage DC-DC Converter (BHDC), or a low-voltage DC-DC converter (LDC).

That is, the charging/discharging means 150 may charge the battery 300 by using the output from the fuel cell stack 200 such that the battery 300 is charged up to a preset amount. The battery 300 charged by the charging/discharging means 150 may drive accessories etc. of the fuel cell system when the launch control function is activated.

The fuel cell vehicle may further include multiple auxiliary devices BoP for assisting the fuel cell stack 200, and the controller 400 may control the auxiliary devices such that the auxiliary devices (not illustrated) consume maximum power.

Specifically, the auxiliary devices may be accessories of the fuel cell system. That is, in order for the fuel cell vehicle to exert the maximum output within a short period of time, the accessories of the fuel cell system, which assist the fuel cell stack such that the fuel cell stack can exert a high output, preferably consume the maximum power, thereby enabling the fuel cell stack 200 to exert a high output.

The fuel cell vehicle may further include a cooling device 700 for cooling the fuel cell stack, and the controller 400 may control the cooling device 700 so as to cool the fuel cell stack 200.

Specifically, the cooling device 700 may use a cooling medium such that the fuel cell stack 200 is cooled through heat exchange between the fuel cell stack 200 and the cooling medium.

The electricity generating reaction in the fuel cell stack 200 corresponds to heat generating reaction from chemical point of view. As the fuel cell stack 200 generates an output, the fuel cell stack 200 has an increased temperature. The higher the temperature, the less output per hour the fuel cell stack 200 can generate. Therefore, the cooling device 700 of the fuel cell stack 200 is preferably maximally driven such that the fuel cell stack 200 can maintain the output.

Meanwhile, upon receiving a launch control function activation request, the controller 400 may compare the current output of the fuel cell stack 200 with power that can be consumed by the multiple auxiliary devices BoP, the driving motor 500, or the battery 300. When the current output of the fuel cell stack 200 is larger, the controller 400 may adjust the opening/closing of an air cut-off valve 800 such that the current output of the fuel cell stack 200 is controlled to be lower than the power that can be consumed by the multiple auxiliary devices BoP, the driving motor 500, or the battery 300.

Specifically, when the current output of the fuel cell stack 200 is larger than the sum of power that can be consumed by the multiple auxiliary devices BoP, the driving motor 500, or the battery 300, an overvoltage may be applied to a main bus end 600. In this case, the current output of the fuel cell stack 200 is preferably controlled to be lower than the sum of power that can be consumed by the multiple auxiliary devices BoP, the driving motor 500, or the battery 300.

In this case, the air cut-off valve 800 is preferably adjusted to be closed such that the amount of air flowing into the cathode of the fuel cell stack 200 decreases.

The controller 400 may identify the current output of the fuel cell stack 200 or the amount of charging of the battery 300 and may output a signal indicating that the launch control function can be activated when the output of the fuel cell stack 200 or the amount of charging of the battery 300 reaches a preset value.

Specifically, the controller 400 may set the output of the fuel cell stack 200 and the amount of charging of the battery, on the basis of which the launch control function can be activated. For example, the amount of charging of the battery 300, on the basis of which the launch control function can be activated, may be set to be 80-90%.

In addition, the battery 300 may be used to drive accessories of the fuel cell system, or to assist driving of the driving motor 500 that the fuel cell stack 200 drives. Therefore, the controller 400 preferably outputs a signal indicating that the launch control function can be activated only when the current output of the fuel cell stack 200 and the amount of charging of the battery 300 both satisfy preset values.

The signal indicating that the launch control function can be activated may be output visually to the vehicle cluster, for example, or output as a sound.

Meanwhile, upon receiving a launch control function activation request, the controller 400 may compare the current output of the fuel cell stack 200 with power that can be consumed by the multiple auxiliary devices BoP, the driving motor 500, or the battery 300. When the current output of the fuel cell stack 200 is smaller, the controller 400 may fully open the air cut-off valve 800.

Specifically, when the current output of the fuel cell stack 200 is larger than the power that can be consumed by the multiple auxiliary devices BoP, the driving motor 500, or the battery 300, the air cut-off valve 800 is adjusted to be closed so as to maintain durability of the fuel cell system.

However, when the current output of the fuel cell stack 200 is smaller than the electric power that can be consumed by the multiple auxiliary devices BoP, the driving motor 500, or the battery 300, the air cut-off valve 800 is preferably opened fully so as to generate a high output because the fuel cell stack 200 can generate more output.

The controller 400 may identify the current output of the fuel cell stack 200 or the amount of charging of the battery 300 and may output a signal indicating that the launch control function can be activated when the output of the fuel cell stack 200 or the amount of charging of the battery 300 reaches a preset value.

Specifically, the controller 400 may set the output of the fuel cell stack 200 and the amount of charging of the battery, on the basis of which the launch control function can be activated. For example, the amount of charging of the battery, on the basis of which the launch control function can be activated, may be set to be 80-90%.

In addition, the battery 300 may be used to drive accessories of the fuel cell system, or to assist driving of the driving motor 500 that the fuel cell stack 200 drives. Therefore, the controller 400 preferably outputs a signal indicating that the launch control function can be activated only when the current output of the fuel cell stack 200 and the amount of charging of the battery 300 both satisfy preset values.

After outputting a signal indicating that the launch control function can be activated, the controller 400 may determine whether the user has an intention to accelerate and may drive the vehicle when an intention to accelerate is confirmed.

Specifically, the user's intention to accelerate may correspond to pressing the acceleration pedal in the vehicle, and may be confirmed if a signal indicating that the launch control function can be activated, output to the cluster, is touched.

When the user's intention to accelerate is confirmed, the controller 400 may drive the vehicle with the maximum output such that the vehicle can reach the top speed within a short period of time.

If it is confirmed that the user has no intention to accelerate after outputting a signal indicating that the launch control function can be activated, the controller 400 may deactivate the launch control function.

Specifically, after outputting the signal indicating that the launch control function can be activated, the vehicle may be driven according to the user's intention to accelerate. However, if the user has no intention to accelerate within a predetermined period of time after outputting a signal indicating that the launch control function can be activated, the controller 400 may determine that the user has no will to activate the launch control function and may deactivate the launch control function.

When the launch control function is deactivated, the air compressor 100 is driven in the state before the launch control function is activated, and the target amount of charging of the battery 300 may be decreased.

If it is confirmed that the user has no intention to accelerate until the amount of charging of the battery 300 reaches the target amount of charging after outputting a signal indicating that the launch control function can be activated, the controller 400 may deactivate the launch control function.

Specifically, after outputting the signal indicating that the launch control function can be activated, the vehicle may be driven according to the user's intention to accelerate. However, if the amount of charging of the battery reaches the target amount of charging after outputting a signal indicating that the launch control function can be activated, the controller 400 may determine that the user has no will to activate the launch control function and may deactivate the launch control function.

That is, if the output generated by the fuel cell stack 200 is continuously directed to the battery 300 although the amount of charging of the battery has reached the target amount of charging, an overvoltage may be applied to the fuel cell system including the main bus end 600, thereby adversely affecting durability. Therefore, when the amount of charging of the battery 300 reaches the target amount of charging, the launch control function is preferably deactivated.

In this case, the air compressor 100 is driven in the state before the launch control function is activated, and the target amount of charging of the battery 300 may be decreased.

Figure 2:
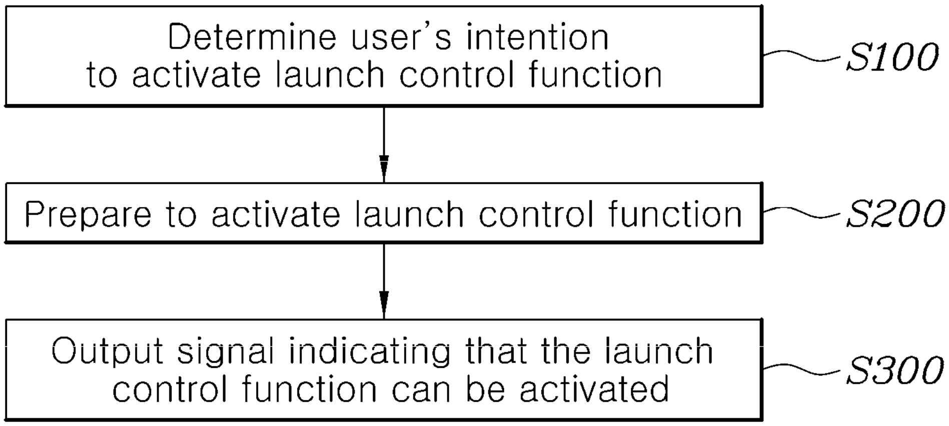
FIG. 2 illustrates a fuel cell vehicle control method according to an embodiment of the present disclosure.

Referring to FIG. 2, a method for controlling the fuel cell vehicle includes a step S100 in which the controller 400 determines whether the user has an intention to activate the launch control function, a step S200 in which the controller 400 prepares to activate the launch control function; and a step S300 in which the controller 400 outputs a signal indicating that the launch control function can be activated.

Specifically, the user may request the launch control function or touching the cluster embedded in the fuel cell vehicle or by simultaneously pressing the acceleration pedal and the brake pedal, thereby expressing an intention to activate the launch control function.

The controller 400 then confirms that the user has an intention to activate the launch control function, and prepares to activate the launch control function. In the step of preparing to activate the launch control function, the fuel cell stack 200 and the battery 300 are both prepared to exert the maximum output. The driving speed of the air compressor 100 is increased, and the battery 300 may be charged with the output of the fuel cell stack 200 such that the battery 300 can exert an appropriate level of output as well.

The battery 300 also needs to be prepared to exert a large amount of output, and the target amount of charging of the battery 300 may thus be set higher than when the launch control function is deactivated.

The controller 400 then outputs a signal indicating that the launch control function can be activated if the amount of charging of the battery 300 or the output of the fuel cell stack 200 reaches a preset value (for example, this value may be set to be 80-90%). Such a signal may be output visually to the vehicle cluster, or output as a sound.

The user may express an intention to accelerate by pressing the acceleration pedal according to the outputted signal or touching the signal displayed on the cluster, thereby driving the vehicle at the top speed.

If the user expresses no intention to accelerate even after outputting a signal indicating that the launch control function can be activated, it may be confirmed that the user has no will to activate the launch control function, and the launch control function may be deactivated.

In addition, if the battery 300 reaches the maximum amount of charging after outputting a signal indicating that the launch control function can be activated, it may be confirmed that the user has no will to activate the launch control function, and the launch control function may be deactivated.

When the launch control function is deactivated, the air compressor 100 is driven in the state before the launch control function is activated. In addition, target amount of charging of the battery 300 is decreased, and a device or the like for consuming power in the fuel cell stack 200 or the battery 300 may be driven.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

The invention claimed is:

1. A fuel cell vehicle comprising:

a fuel cell stack;

an air compressor configured to supply air to the fuel cell stack; and a controller configured to increase driving of the air compressor upon a launch control function activation request, charge a battery through an output of the fuel cell stack, thereby preparing to activate a launch control function, and output a signal indicating that the launch control function can be activated visually to a vehicle cluster or as a sound when the output of the fuel cell stack or an amount of charging of the battery has reached a preset value, wherein the controller sets a capacity lower than the maximum capacity of the battery as the target amount of charging of the battery when the launch control function is deactivated, and increases the target amount of charging upon the launch control function activation request to be higher than the target amount of charging set when the launch control function is deactivated, so as to prepare the battery to supply power to a driving motor during the launch control function.

2. The fuel cell vehicle of claim 1, wherein the controller drives the air compressor at a maximum speed upon the launch control function activation request.

3. The fuel cell vehicle of claim 1, wherein the fuel cell vehicle further comprises a charging or discharging means, and the controller controls the charging or discharging means such that the amount of charging of the battery reaches the preset value upon the launch control function activation request.

4. The fuel cell vehicle of claim 1, wherein the fuel cell vehicle further comprises a plurality of auxiliary devices (BoP) configured to assist the fuel cell stack, and the controller controls the plurality of auxiliary devices such that the plurality of auxiliary devices consume maximum power.

5. The fuel cell vehicle of claim 1, wherein the fuel cell vehicle further comprises a cooling device configured to cool the fuel cell stack, and the controller controls the cooling device such that the cooling device cools the fuel cell stack.

6. The fuel cell vehicle of claim 1, wherein the controller compares the current output of the fuel cell stack with power which can be consumed by a plurality of auxiliary devices (BoP), a driving motor, or a battery upon the launch control function activation request, and adjusts opening or closing of an air cut-off value when the current output of the fuel cell stack is larger than the power which can be consumed by the plurality of auxiliary devices, the driving motor, or the battery, such that the current output of the fuel cell stack is controlled to be lower than the power which can be consumed by the plurality of auxiliary devices (BoP), the driving motor, or the battery.

7. The fuel cell vehicle of claim 6, wherein the controller identifies the current output of the fuel cell stack or the amount of charging of the battery, and outputs a signal indicating that the launch control function can be activated when the current output of the fuel cell stack or the amount of charging of the battery has reached a preset value.

8. The fuel cell vehicle of claim 1, wherein the controller compares the current output of the fuel cell stack with power which can be consumed by a plurality of auxiliary devices (BoP), a driving motor, or a battery upon the launch control function activation request, and fully opens an air cut-off value when the current output of the fuel cell stack is smaller than the power which can be consumed by the plurality of auxiliary devices, the driving motor, or the battery.

9. The fuel cell vehicle of claim 8, wherein the controller identifies the current output of the fuel cell stack or the amount of charging of the battery, and outputs a signal indicating that the launch control function can be activated when the current output of the fuel cell stack or the amount of charging of the battery has reached a preset value.

10. The fuel cell vehicle of claim 1, wherein the controller determines a user's intention to accelerate after outputting a signal indicating that the launch control function can be activated, and drives the vehicle when the user is deemed to have an intention to accelerate.

11. The fuel cell vehicle of claim 1, wherein the controller deactivates the launch control function when a user is deemed to have no intention to accelerate after outputting a signal indicating that the launch control function can be activated.

12. The fuel cell vehicle of claim 1, wherein the controller deactivates the launch control function when a user is deemed to have no intention to accelerate until the amount of charging of the battery reaches the target amount of charging after outputting a signal indicating that the launch control function can be activated.

13. A method for controlling the fuel cell vehicle of claim 1, wherein the fuel cell vehicle includes a fuel cell stack, an air compressor configured to supply air to the fuel cell stack, a battery, and a controller, the method comprising, by the controller:

determining a user's intention to activate a launch control function;

preparing to activate the launch control function;

increasing a target amount of charging of the battery upon the launch control function activation request to be higher than the target amount of charging set when the launch control function is deactivated, so as to prepare the battery to supply power to a driving motor during the launch control function, wherein the controller sets a capacity lower than a maximum capacity of the battery as the target amount of charging of the battery when the launch control function is deactivated; and outputting a signal indicating that the launch control function can be activated visually to a vehicle cluster or as a sound when an output of the fuel cell stack or an amount of charging of the battery reaches a preset value.

14. The method of claim 13, wherein, in the preparing to activate the launch control function, air compressor driving is increased, and the battery is charged through an output of the fuel cell stack, thereby preparing to activate the launch control function.

* * * * *